Feb. 17, 1931.  E. G. MASCARENHAS  1,793,429
AUTOMATIC TIRE INFLATING DEVICE
Filed Aug. 10, 1929
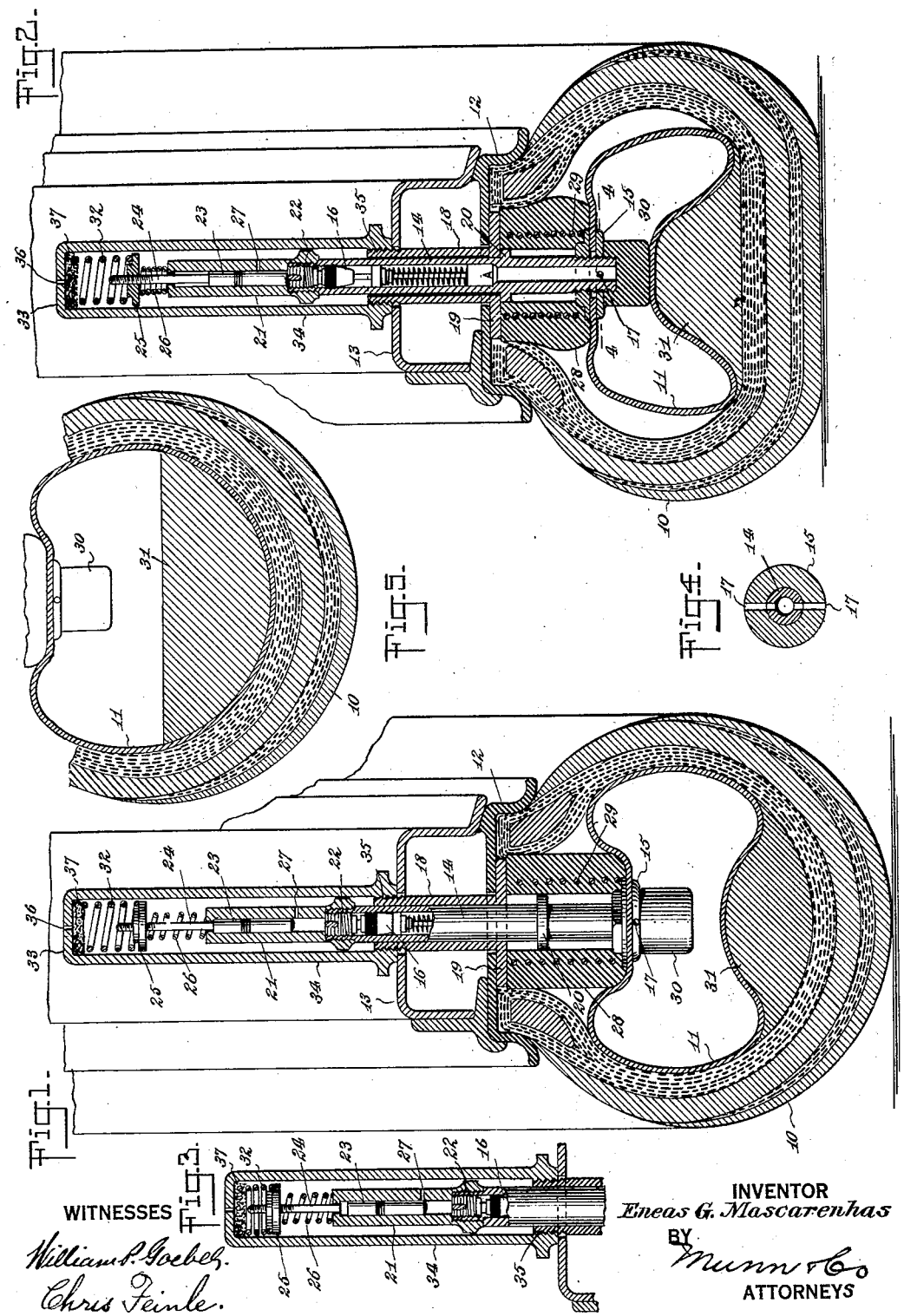
INVENTOR
*Eneas G. Mascarenhas*
BY
*Munn & Co*
ATTORNEYS
WITNESSES
*William P. Goebel.*
*Chris Feinle.*

Patented Feb. 17, 1931

1,793,429

UNITED STATES PATENT OFFICE

ENEAS G. MASCARENHAS, OF JUIZ DE FORA, BRAZIL

AUTOMATIC TIRE-INFLATING DEVICE

Application filed August 10, 1929. Serial No. 384,356.

This invention relates to a tire inflating device and relates more particularly to the combination of an inflatable tire applied to a vehicle wheel, and a device operable by the rotation of the wheel to inflate the tire, so as to constantly maintain an adequate amount of air pressure in the tire.

The principal object of the invention is the provision of a device of the indicated character which will be of simple, practical and inexpensive form, which is easy to apply, which requires little or no attention, which is designed to inflate the tire as soon as the pressure falls below a certain degree, while a vehicle is in motion, thereby to prolong the life of the tire, and to obviate considerable work ordinarily required in inflating a tire.

Another object of the invention is the provision of a device of the indicated character which enables the inflation of the tire in the ordinary ways.

With the foregoing and other objects in view, the invention resides in the particular combination, relative disposition, and functions of the parts hereinafter fully described and illustrated in the accompanying drawing, in which—

Figure 1 is a transverse section of a tire and its rim selected to illustrate the device of the present invention, which is applied thereto, and showing the relationship of parts when the tire has a normal or running air pressure therein.

Fig. 2 is a view similar to Fig. 1, but showing a relationship of the parts when the tire is under-inflated or the pressure therein has decreased from the normal running pressure.

Fig. 3 is a section showing the relationship of the parts of the pump when subjected to a severe impact.

Fig. 4 is a detail section taken on the line 4—4 of Fig. 2.

Fig. 5 is a detail section of a modification.

Referring now more particularly to the several views of the drawing it will be apparent that there has been shown a pneumatic tire which consists of an outer casing or shoe 10, an inner tube 11 for the casing 10, and a tire rim 12 applied to a rim or felly 12 of a vehicle wheel. The inflating device of the present invention is supported by the rims 12 and 13, and is in communication with the interior of the tube 11 to inflate the tire by the rotation of the wheel, when the air pressure in the tube has decreased below a normal running pressure.

The inflating device involves a valve stem 14 which is connected with the inner tube 11 as at 15. The stem 14 has arranged therein a check valve 16 of any well known form to permit air to be pumped into the tube 11 through the stem 14, and to prevent unintentional escape of the air from the tube 11 through the stem 14. The lower end of the stem 14 has holes 17 through which the air enters the tube 11 from the stem 14. The stem 14 is guided for up and down sliding movement in a sleeve or guide 18. The sleeve 18 projects through aligned holes in the tire rim 12 and rim or felly 13, and has a flange 19 in engagement with the tire rim 12. The stem 14 is in fact disposed radially with respect to the axis of rotation of the wheel, and is therefore movable radially inward and outward. The stem 14 has a collar 20 engageable with the flange 19 to limit the radial inward movement of the stem 14. A pump presently to be described is detachably connected with the inlet end of the stem 14. The pump includes a cylinder 21 in threading engagement at one end with the inlet end of the stem 14 as at 22. A piston 23 is movable in the cylinder 21. The piston 23 has a stem 24 on which is adjustably mounted a disk 25. A coil spring 26 surrounds the stem 24 and has one end thereof in engagement with the disk 25 and the opposite end thereof is in engagement with the opposing end of the cylinder 21. The cylinder has an inlet 27 which admits air to the interior of the cylinder 21 when the piston 23 is in its normal position. This air is displaced and forced into the inner tube 11 when the stem 14 and connected cylinder 21 is moved in one direction, or in other words radially inward with respect to the axis of the wheel. The stem 14 and connected cylinder 21 are moved radially outward by a buffer 28 of resilient material such as rubber in combination with a spiral spring 29. The buffer 28 surrounds the stem 14 and is disposed between the flange 19 and the fastening 15 of the stem 14. The end of the valve stem 14 projecting into the inner tube 11 has applied thereto an impact member 30 preferably of rubber. The inner tube 11 has applied thereto provision for striking the impact member 30 by the rotation of the wheel, to move the stem 14 and connected pump cylinder 21 both radially inward, to force a quantity of air into the inner tube 11. Such provision is in the form of an enlargement or lump of rubber 31 vulcanized to the inner tube on the outside as shown in Fig. 1 or on the inside of the tube as shown in Fig. 5.

From the foregoing it will be apparent that the pump described will be operated by the cooperative action of the provision 31 and the buffer 28, which move the valve stem 14 and connected pump cylinder 21 in opposite directions to force air into the inner tube 11 when the pressure therein has fallen below a certain degree. This decrease may arise from slow punctures or leaks.

In order to avoid undue strain on the parts while the tire has a normal air pressure therein, and the enlargement 31 is forced into contact with the impact member 30, on account of traveling over extremely rough roads, there is provided a spring 32 which is arranged between the disk 25 on the piston stem 24, and the end wall 33 of a valve stem cap 34 detachably connected as at 35 with the sleeve 18. This cap 34 in cooperation with the flange 19 also serves to hold the sleeve 18 against displacement. The cap 34 has an air inlet 36 in the wall 33 thereof. Air enters the cap 34 through the inlet 36 and then enters the cylinder 21 through the inlet 27 for the intended purpose. Should the enlargement 31 strike the impact member 30 while the inner tube has a normal running pressure of air therein, the piston 23 will be allowed to move with the cylinder 21, consequently no more air will be injected into the inner tube 11. The tire pressure is therefore controlled by the spring 32 whose tension may be regulated by adjusting the disk 25 on the stem 24. A small filtering disk 37 is arranged in the cap 34 at the inlet 36 for an obvious purpose.

From the foregoing it will be obvious that when the air pressure in the inner tube has decreased from a normal running pressure, the distance between the impact member 30 and the enlargement 31 will gradually decrease until such time when the enlargement 31 will strike the member 30 each revolution of the wheel, thus operating the pump, and little by little air will be forced into the inner tube 11 until an adequate air pressure in the inner tube 11 is obtained.

In case of a severe puncture of the tire, the enlargement 31 will strike the impact member 30 severely to warn the operator in time to take the necessary steps to repair the tire before damage has been done. The cap 34 may be removed, also the pump which enables the inflation of the inner tube in any of the usual ways, after which the pump and cap may be replaced.

What is claimed is:

A tire inflating device including the combination of a tubular member having a check valve at one end to admit air into said member and to prevent the escape of air through said valve, said member also having an air outlet at the end opposite said valve, means guiding said tubular member for axial movement in opposite directions, a cylinder having one end connected with the valved end of said tubular member, said cylinder having an air inlet, a piston operable in said cylinder, means to restrain the movement of the piston in each direction, and means to cause the reciprocation of the tubular member and cylinder to cause the piston to force air from the cylinder past said valve into said tubular member and out of its outlet.

ENEAS G. MASCARENHAS.